United States Patent
Altundas et al.

(10) Patent No.: US 10,876,395 B2
(45) Date of Patent: Dec. 29, 2020

(54) CROSS-WELL SEISMIC MONITORING OF CARBON DIOXIDE INJECTION

(71) Applicant: SCHLUMBERGER TECHNOLOGY CORPORATION, Sugar Land, TX (US)

(72) Inventors: Yusuf Bilgin Altundas, Burlington, MA (US); Jiyao Li, Piermont, NY (US); Nikita Chugunov, Arlington, MA (US); Terizhandur S. Ramakrishnan, Boxborough, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 132 days.

(21) Appl. No.: 15/563,801

(22) PCT Filed: Mar. 30, 2016

(86) PCT No.: PCT/US2016/024975
§ 371 (c)(1),
(2) Date: Oct. 2, 2017

(87) PCT Pub. No.: WO2016/160964
PCT Pub. Date: Oct. 6, 2016

(65) Prior Publication Data
US 2018/0080313 A1 Mar. 22, 2018

Related U.S. Application Data

(60) Provisional application No. 62/141,552, filed on Apr. 1, 2015.

(51) Int. Cl.
*E21B 47/107* (2012.01)
*E21B 43/16* (2006.01)
(Continued)

(52) U.S. Cl.
CPC .......... *E21B 47/107* (2020.05); *E21B 43/164* (2013.01); *G01V 1/308* (2013.01);
(Continued)

(58) Field of Classification Search
CPC ....... E21B 43/164; E21B 47/101; G01V 1/42; G01V 1/308; G01V 2210/163; G01V 2210/612; G01V 2210/6122
See application file for complete search history.

(56) References Cited

U.S. PATENT DOCUMENTS 6,302,204 B1  10/2001  Reimers et al.
2009/0043554 A1  2/2009  Home et al.
(Continued)

OTHER PUBLICATIONS

Batzle, M., et al., "Seismic properties of pore fluids", Geophysics, 1992, 57(11), pp. 1396-1408.
(Continued)

*Primary Examiner* — Caroline N Butcher
(74) *Attorney, Agent, or Firm* — Trevor G. Grove

(57) ABSTRACT

Methods are provided for tracking carbon dioxide ($CO_2$) migration in a hydrocarbon-bearing reservoir located under a cap rock in a formation. In one embodiment, at least one seismic source and a plurality of receivers are located in spaced boreholes in the formation with the sources and receivers located near or at the reservoir so that direct paths from the sources to the receivers extend through the reservoir. $CO_2$ is injected from the borehole containing the seismic sources into the reservoir, and the sources are activated multiple times over days and seismic signals are detected at the receivers. From the detected signals, time-lapse travel delay of direct arrivals of the signals are found and are used to track $CO_2$ in the reservoir as a function of time. In another embodiment, the sources and receivers are located above the reservoir, and reflected waves are utilized to track the $CO_2$.

14 Claims, 12 Drawing Sheets

(51) Int. Cl.
*G01V 1/30* (2006.01)
*G01V 1/42* (2006.01)

(52) U.S. Cl.
CPC .......... *G01V 1/42* (2013.01); *G01V 2210/163* (2013.01); *G01V 2210/612* (2013.01); *G01V 2210/6122* (2013.01)

(56) References Cited

U.S. PATENT DOCUMENTS

| | | | |
|---|---|---|---|
| 2009/0272531 | A1 | 11/2009 | Montaron |
| 2010/0299126 | A1* | 11/2010 | Chugunov .............. G01V 11/00 703/10 |
| 2012/0092960 | A1 | 4/2012 | Gaston et al. |
| 2013/0173166 | A1* | 7/2013 | Badri ....................... G01V 7/06 702/12 |
| 2013/0277049 | A1* | 10/2013 | Liu ..................... E21B 43/2406 166/252.1 |
| 2013/0297273 | A1* | 11/2013 | Altundas ................ G01V 1/282 703/10 |
| 2014/0257706 | A1 | 9/2014 | Biterge et al. |

OTHER PUBLICATIONS

Daley, T. M.,et al., "Constraining the reservoir model of an injected CO2 plume with crosswell CASSM at the Frio-II brine pilot", International Journal of Greenhouse Gas Control, 2011, 5(4), pp. 1022-1030.

Gassmann, F., "Elastic Waves Through a Packing of Spheres", Geophysics, 1951, 16(4), pp. 673-685.

Ghedan, S., "Global Laboratory Experience of CO2-EOR flooding", SPE-125581-MS, presented at the 2009 SPE/EAGE Reservoir Characterization and Simulation Conference, Abu Dhabi, UAE, 15 pages.

Han, D-H. et al., "Velocity and density of oil-HC-CO2 miscible mixtures", SEG Annual Meeting, 2013, pp. 2831-2835.

Manrique, E., et al., "EOR: Current Status and Opportunities", SPE-130113, Society of Petroleum Engineers, presented at the 2010 SPE Improved Oil Recovery Symposium, Tulsa, Oklahoma, USA, 21 pages.

Vasco, D. W. et al., "Utilizing the onset of time-lapse changes: a robust basis for reservoir monitoring and characterization", Geophysical Journal International, 2014, 197, pp. 542-556.

\* cited by examiner

CROSS-WELL SEISMIC MONITORING OF CARBON DIOXIDE INJECTION

PRIORITY

This application claims the benefit of U.S. application having Ser. No. 62/141,552, filed Apr. 1, 2015, which application is incorporated herein by reference in its entirety.

TECHNICAL FIELD

The subject disclosure relates to the production of hydrocarbons from earth formations. More particularly, the subject disclosure relates to methods of cross-well seismic monitoring of a carbon dioxide injection in enhanced oil recovery (EOR) procedures. The disclosure has application to both the modeling of a formation and to actual EOR induced production from a formation.

BACKGROUND

Carbon dioxide is regarded as one of the best injection fluids for enhancing oil recovery through developed miscibility. When injected into a oil-bearing formation, carbon dioxide dissolves in oil, thereby reducing the viscosity and increasing the mobility of the oil. Moreover, oil that might have initially been bypassed in an EOR flood will undergo swelling caused by carbon dioxide dissolution into the oil, promoting further enhanced oil recovery. Furthermore, oil partitions into the carbon dioxide rich phase, and this phase at appropriate pressure conditions becomes miscible with the hydrocarbon containing carbon dioxide. Although developed miscibility, increased mobility, and the swelling effect improve the oil recovery on the small scale, the overall oil recovery rate at the field scale is strongly affected by channeling, fingering, and bouyancy effects. Injected carbon dioxide forms channels extending into the oil and leaving part of the formation unswept. Bouyancy of injected carbon dioxide causes upward migration and forms a gravity tongue beneath impermeable layers, which leaves the bottom of the reservoir uncontacted with carbon dioxide.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods are provided for conducting time-lapse seismic monitoring of formations having offset wells for the purpose of quantifying carbon dioxide migration in the formation. One or more acoustic sources are located in a first well in and/or about the depth of a reservoir of interest located beneath a caprock, and a plurality of acoustic receivers are located in a second well in and/or about the depth of the reservoir of interest. As carbon dioxide is injected into the reservoir of interest from the first well, the one or more acoustic sources are activated over a period of time (e.g., daily), and the travel times of direct arrivals are measured at the receivers. When carbon dioxide invades an acoustic ray path between a source and receiver pair, it alters the effective sound speed. For most cases the effective sound speed is decreased, and, hence, the travel time of a direct arrival for that ray path increases (i.e., there is a delay), and the delay increases as more of the ray path is invaded by carbon dioxide. In the rest of the application, we shall assume that the effective sound is decreased, although the invention is equally valid when the velocity is increased due to the presence of an injection agent. Eventually, when the entire ray path extends through a carbon dioxide invaded portion of the formation, the delay reaches a peak value at which point elastic properties of the formation along the ray path do not change. Based on the travel time delay, the presence of the carbon dioxide at locations in the reservoir relative to the source and receiver locations can be identified. In addition, the carbon dioxide arrival time at the production well can be predicted.

In one aspect, using acoustic sources located above the reservoir in the first well and using acoustic receivers in the second well located above the reservoir, the amplitude and/or waveform of waves that were reflected at the caprock-reservoir interface may be detected. As carbon dioxide is injected into the reservoir of interest from the first well, the acoustic sources are activated over a period of time (e.g., daily), and the amplitudes and/or waveforms of the reflected waves are measured at the receivers. As carbon dioxide invades the reservoir and arrives at the caprock, the amplitude and/or waveform of the reflected waves from the caprock-reservoir interface will change due to a change in the acoustic impedance of the reflector. The change in amplitude and/or waveform of the reflected waves may be used to track the movement of carbon dioxide at the caprock-reservoir interface.

In one aspect, the change in amplitude and/or waveform of the reflected waves may be used in conjunction with or independently of the travel time delay.

Additional aspects, embodiments, objects and advantages of the disclosed methods may be understood with reference to the following detailed description taken in conjunction with the provided drawings.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Carbon dioxide is regarded as one of the best injection fluids for enhancing oil recovery through developed miscibility. When injected into a oil-bearing formation, carbon dioxide dissolves in oil, thereby reducing the viscosity and increasing the mobility of the oil. Moreover, oil that might have initially been bypassed in an EOR flood will undergo swelling caused by carbon dioxide dissolution into the oil, promoting further enhanced oil recovery. Furthermore, oil partitions into the carbon dioxide rich phase, and this phase at appropriate pressure conditions becomes miscible with the hydrocarbon containing carbon dioxide. Although developed miscibility, increased mobility, and the swelling effect improve the oil recovery on the small scale, the overall oil recovery rate at the field scale is strongly affected by channeling, fingering, and bouyancy effects. Injected carbon dioxide forms channels extending into the oil and leaving part of the formation unswept. Bouyancy of injected carbon dioxide causes upward migration and forms a gravity tongue beneath impermeable layers, which leaves the bottom of the reservoir uncontacted with carbon dioxide. Therefore, in one aspect, and as discussed in detail hereinafter, injected carbon dioxide is monitored for improving the sweep efficiency and increasing recovery rate in EOR. In another aspect, and as discussed in detail hereinafter, the arrival of carbon dioxide is estimated in order to mobilize well logging measurements in time. Therefore an advance estimate of arrival times of carbon dioxide allows the minimization of idle crew-and-logging time.

Figure 2A:
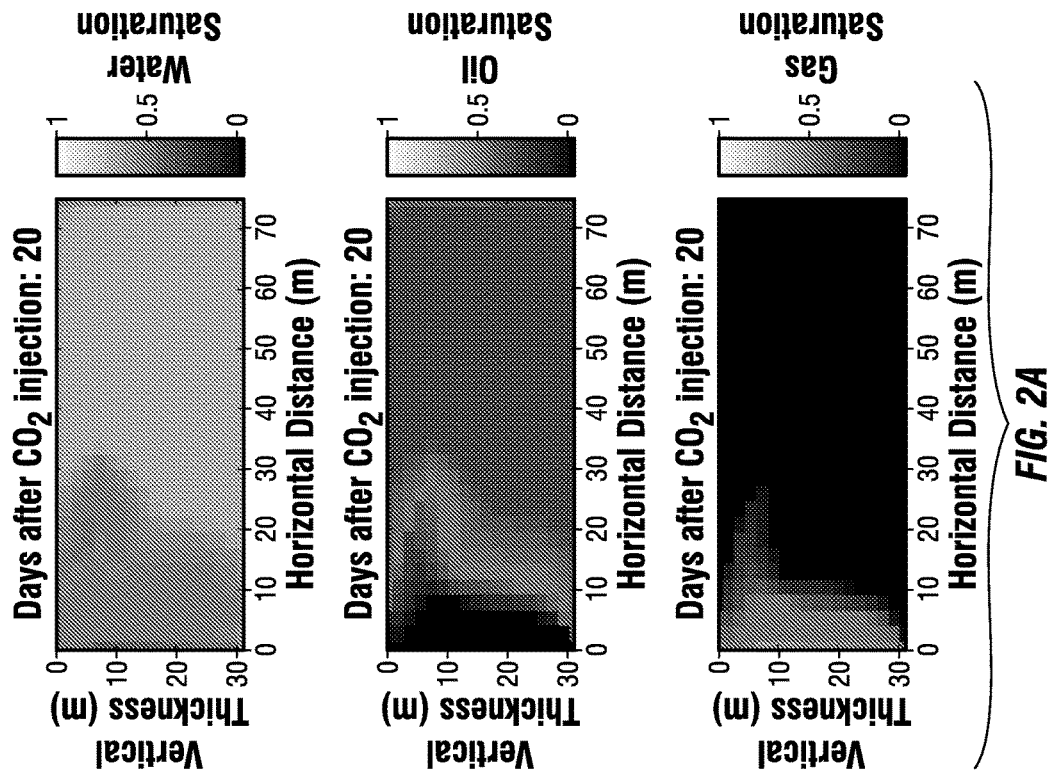
FIGS. 2a-2c are simulated profiles of water, oil and carbon dioxide after twenty, forty, and sixty days of carbon dioxide ($CO_2$) injection into a depleted oil reservoir.
Figure 1:
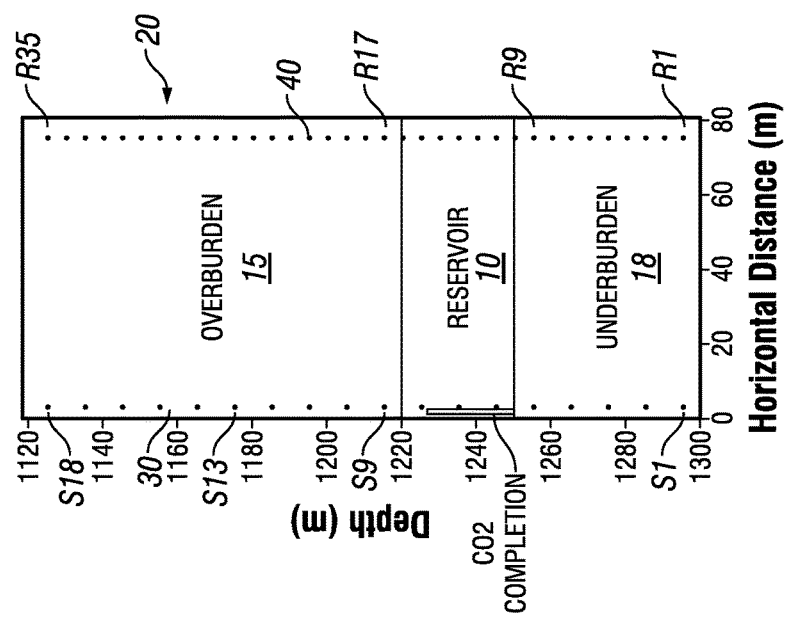
FIG. 1 is a schematic of a reservoir in a formation having seismic sources and receivers in offset wells.
Figures 2B, 2C:
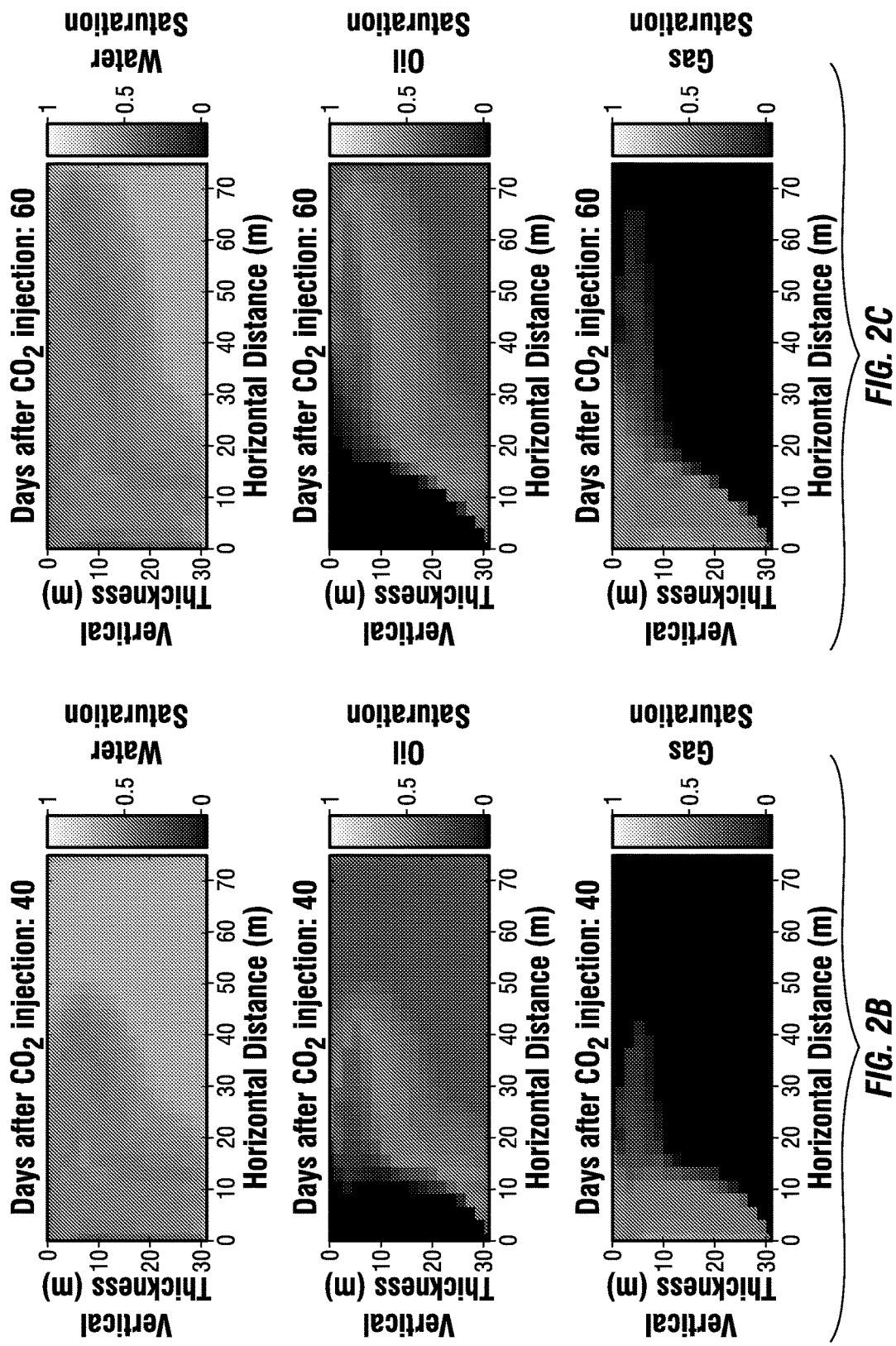

According to one aspect, seismic monitoring of $CO_2$ away from the injection well during and post injection can help improve the sweep efficiency and increase oil recovery. In order to identify manners of accurately monitoring movement of the $CO_2$, it may be desirable to first simulate carbon dioxide injection into a mature oil field. In particular, as suggested by the schematic of a computational domain for reservoir simulation of FIG. 1, a thirty-one meter thick homogeneous oil reservoir 10 with an overburden cap rock 15 is modeled starting at a depth of 1220 meters in a formation 20. The reservoir 10 is assumed to be homogeneous and has a porosity of 20% and a vertical permeability of 45 mD. The reservoir has two vertical wells 30, 40, with well 30 for injection and well 40 for production/monitoring. Wells 30 and 40 are 75 meters apart from each other. The injection well 30 with eighteen seismic sources (S1, S5, S9 and S18 labeled and with sources S1-S5 in an underburden layer 18, sources S6-S8 in the reservoir 10, and sources S9-S18 in the cap rock 15) is completed between the depths of 5.5 meters and 31 meters in the reservoir 10 (depths 1225.5 and 1251 in the formation). Completion/monitoring well 40 is shown with thirty-five seismic receivers (R1, R9, R17 and R35 labeled with receivers R1-R9 in the underburden layer 18, receivers R10-R16 in the reservoir 10, and receivers R18-R35 in the cap rock 15). The seismic sources and transmitters can be built into completions within the two wells 30, 40 or they can be delivered into the two wells using wireline tool strings. Formation properties used in the simulation are given in Table 1. Reservoir oil is assumed to be formed of hydrocarbons $C_4$ through $C_{12}$ and different sets of initial oil compositions may be considered. Injection of $CO_2$ into depleted oil is simulated using a compositional simulator (e.g., ECLIPSE, which is a trademark of Schlumberger Technology Corporation) for which desired relative permeability and capillary pressure curves may be provided. Prior to $CO_2$ injection, the reservoir was water-flooded to a residual oil saturation of 30%. Water-flooding is followed by 125 days of $CO_2$ injection while oil is produced at bottom-hole pressure (BHP) control. Simulated saturation profiles after 20, 40 and 60 days of $CO_2$ injection are shown FIGS. 2a-2c where the water and oil saturations away from the injection well are seen to be decreasing over time, and the gas ($CO_2$) saturation is seen to be increasing away from the injection well over time particularly near the top of the reservoir.

TABLE 1

Input parameters and reservoir dimensions used in the simulation

| Properties | SI |
| --- | --- |
| Grid dimensions | 30 × 30 × 18 |
| Dx, Dy, Dz | 1.83 m |
| $k_x$ and $k_y$ | 50 mD |
| $k_z$ | 45 mD |
| φ | 20% |
| $S_{wr}$, $S_{or}$, $S_{gr}$ | 0.2, 0.3, 0.2 |
| Water injection rate | 79.5 sm³/day |
| $CO_2$ injection rate | 8.45 sm³/day |
| Reservoir temperature | 100° C. |
| Reservoir pressure | 120 bar (12 Mpa) |
| Initial brine salinity | 100 kg/sm³ |
| Salinity of injected water | 10 kg/sm³ |
| $CO_2$ injection period | 125 days |

In order to model the formation and account for $CO_2$ dissolution effect on the elastic properties of oil, REFROP-NIST, a code developed by the National Institute of Standards and Technology (NIST) for calculating thermodynamic properties of reference fluid was utilized. Mole fractions of oleic and $CO_2$-rich phases from the reservoir simulation were utilized in fluid substitution models to calculate the effective velocities, and the corresponding synthetic waveforms were generated accordingly. More particularly, time-lapse mole fractions of each hydrocarbon molecule, fluid saturation, and pressure profiles from reservoir simulation are utilized in a $CO_2$, brine and oil fluid substitution model with REFPROP and the effective velocity and bulk density of rock formation are calculated. The mixture model in REFPROP is capable of determining the elastic properties of a limited set of hydrocarbons (up to $C_{12}$) and their mixtures with $CO_2$. The oil components, $C_4$ through $C_{12}$, considered in an ECLIPSE simulator were linked with the reference hydrocarbon molecules available in REFPROP's database and the elastic properties of the fluid mixture (except for brine) were calculated accordingly. In order to calculate the adiabatic bulk modulus of brine, the brine model in Batzle, M., and Wang, Z., "Seismic properties of pore fluids", *Geophysics* 16, p. 1396-1408 (2013) can be used. Calculated elastic properties of reservoir fluid are substituted into either the known Gassmann or patchy saturation models and the effective bulk and shear moduli, bulk density, and the effective compressional and shear velocity profiles of rock matrix are calculated accordingly.

Turning now to synthetic seismic waveform generation, for the continuity of the rays through the region outside the oil reservoir, and as discussed above with reference to FIG. 1, the oil reservoir 10 was provided with a 100 meter thick overburden 15 and a 50 meter thick underburden layer 18 while retaining the interwell distance between the injection well 30 and the production well 40. These two additional layers are assumed to have uniform properties with zero permeability. Eighteen evenly spaced seismic sources S1-S18 were laid in the injection well 30 and thirty-five evenly spaced receivers R1-R35 were laid in the production well 40 between the vertical depths of 1120 m to 1300 m. With that arrangement, time-lapse effective compressional and shear velocity and bulk density profiles from fluid substitution are utilized in TWIST (a trademark of IPGP, France), a 2D seismic waveform code, to generate synthetic seismic waveforms in crosswell geometry. TWIST has the functionality of generating seismic waveforms in both elastic and visco-elastic media, which is desirable in quantifying the changes in seismic response due to $CO_2$ injection.

In one aspect, the same uniform numerical grids in synthetic waveforms as in the reservoir simulation were used in order to avoid the need of interpolating the effective velocity and density profiles for use in synthetic waveform generation. The grid length in the reservoir simulation is sufficiently small to lay at least three numerical grids per wavelength ensuring accurate waveform generation. Magnitude of seismic contrast between pre- and post-$CO_2$ injection depends on the attenuation in seismic response posed by the formation rock and fluid substitution models used to calculate the effective compressional and shear velocity profiles. Recent studies indicate that patchy-saturation models are more suitable for fluid substitution when $CO_2$ is present in the fluid. In order to quantify the effect of fluid substitution models on seismic response, the effective velocities were calculated using Gassmann and a patchy-saturation models for which the simulated saturation and pressure profiles corresponding to pre-$CO_2$ injection (baseline) and 125 days of $CO_2$ injection were utilized. Velocity and density profiles from fluid substitution models were then utilized in TWIST to generate the corresponding synthetic waveforms. The calculations via the patchy saturation model result in a larger effective velocity compared to the velocities obtained by Gassmann model. With the Gassmann model, a larger shift from the baseline seismograms was observed.

Figure 3:
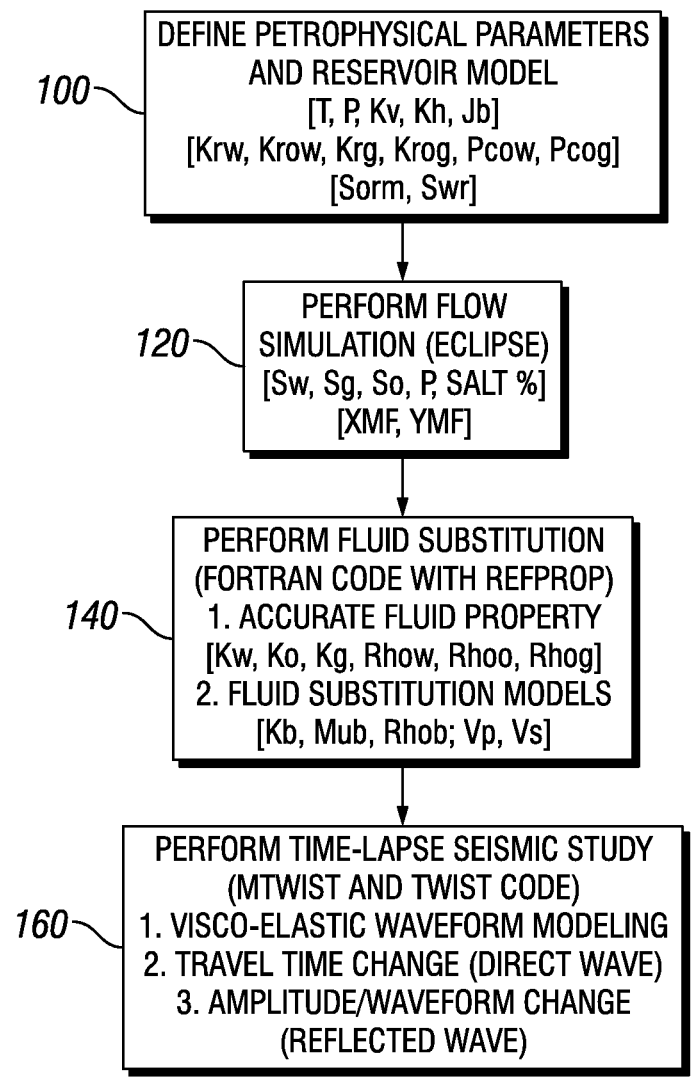
FIG. 3 is a flow chart of the workflow of an integrated reservoir simulation, fluid substitution and synthetic waveform generation model.

Given the above, the workflow of an integrated reservoir simulation, fluid substitution and synthetic waveform generation may be summarized as seen in FIG. 3. In FIG. 3, at 100, petrophysical parameters and reservoir model are defined with temperature T, pressure P, vertical permeability $k_v$, horizontal permeability $k_h$, relative permeability to water $k_{rw}$, oil-gas relative permeability to oil $k_{rog}$, oil-water capillary pressure $P_{cow}$, oil-gas capillary pressure $P_{cog}$, maximum residual oil saturation $S_{orm}$, and irreducible water saturation $S_{wr}$. At 120, the flow simulation is set forth using ECLIPSE or a similar simulator with the water saturation $S_w$, oil saturation $S_o$, salinity, pressure P, mole fractions of liquid $CO_2$ and oil XMF (oil-rich phase, liquid mole fraction), and mole fractions of gas $CO_2$ and oil YMF (CO2-rich phase, gas mole fraction) defined. At 140, fluid substitution is carried out using a REFROP tool with accurate fluid properties defined and fluid substitution models provided. At 160, a time-lapse seismic study may be conducted using TWIST or a modified version of it (MTWIST) with visco-elastic waveform modeling, travel time change of direct seismic waves as discussed hereinafter and/or amplitude or waveform change of reflected seismic waves as discussed hereinafter.

Turning now to time-lapse travel time delay in direct arrivals of seismic waves, it should be appreciated that presence of $CO_2$ in a ray path of a direct wave between a source and receiver pair reduces the effective velocity and causes a delay in $CO_2$ arrival at the receiver. Thus, a non-zero delay time observed in direct arrival measurement indicates that $CO_2$ plume crosses the acoustic ray path between the source and the receiver. If the delay time is a measurable quantity, presence of $CO_2$ can be inferred from the delay time relative to source and receiver coordinates and $CO_2$ plume at a later time or arrival of $CO_2$ at the monitoring well can be predicted using time-lapse change in delay times. In one embodiment, the delay times in direct arrivals are measured using the cross correlation of a reference waveform (baseline) with another waveform measured at the same sensor post $CO_2$ injection. Cross correlation is given by $$R(\tau, x_s, x_r) = \frac{\int d_0(x_s, x_r, t) d_n(x_s, x_r, t+\tau) dt}{\sqrt{\int d_0(x_s, x_r, t)^2 dt} \sqrt{\int d_n(x_s, x_r, t)^2 dt}} \quad (1)$$

where $\tau$ is the time lag and $d_0(x_s, x_r, t)$ and $d_n(x_s, x_r, t)$ are the baseline and perturbed waveforms, respectively, for a source and receiver pair of $x_s$ and $x_r$. The following discrete form of cross-correlation is used to pick the time lag in a seismogram for $(x_s, x_r)$ pair caused by $CO_2$ injection:

$$R(\tau, x_s, x_r) = \frac{\sum_i [(d_0(x_s, x_r, t_i) - \mu_0) \times (d_n(x_s, x_r, t_i - \tau) - \mu_n]}{\sqrt{\sum_i (d_0(x_s, x_r, t_i) - \mu_0)^2} \sqrt{\sum_i (d_n(x_s, x_r, t_i - \tau) - \mu_n)^2}} \quad (2)$$

where $\mu_0$ and $\mu_n$ are the means of the corresponding reference and perturbed seismograms respectively and i is the index value in the discrete summation. Travel time delays in waveforms for each source-receiver pair are measured at each seismic survey (synthetic) time and can be plotted against the survey time ($CO_2$ injection time) for the same source-receiver pairs. An example of travel time delay versus $CO_2$ injection time (survey time) for $x_s$=7 (source S7) and $x_r$=16 (receiver R16) is shown in FIG. 4.

More particularly, a plot of travel time delay vs $CO_2$ injection time contains the characteristics of $CO_2$ movement in a cross-well geometry and is indicative of the whereabouts of a $CO_2$ plume after injection. For instance, the time-lapse travel time delay curve of FIG. 4 for S7 and R16 reveals that the travel time delay increases as more $CO_2$ is injected into the reservoir. It reaches to a peak value at around 70 days of $CO_2$ injection, which corresponds either to the time the $CO_2$ plume arrives at the production well or the effective velocity of the reservoir in the ray path between the source and the receiver is not changing anymore. According to one aspect, the hump in the curve of FIG. 4 is attributed to a $CO_2$-oil bank arrival at the monitoring well. Upon producing the oil bank, the effective velocity in the ray path between the source and receiver pair does not change any further and the delay time in direct arrivals becomes flat.

Figure 4:
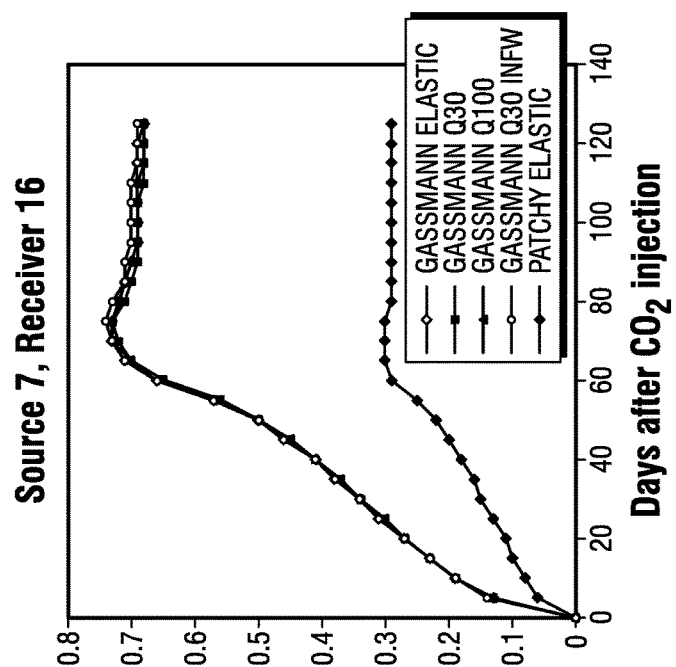
FIG. 4 are plots of time-lapse delay in travel time versus days after carbon dioxide injection for a particular source and receiver pair as calculated based on different rock physics models and attenuation effects.

It will be appreciated that FIG. 4 provides five curves. Four of the curves reveal the effect of attenuation on travel time delay in direct arrivals. In particular, FIG. 4 shows travel time delay vs $CO_2$ injection times with Q>>100 (i.e., a large number), Q=100, Q=30, and Q=30 with infinite central frequency. Delay times under various Q values were not affected much but, here, the implementation of attenuation in the synthetic waveform generation was applied uniformly in the entire model. The conclusion may be different if attenuation is implemented non-uniformly. The sensitivity of the delay time to the fluid substitution models (Gassmann or patchy saturation model) used for generating effective velocity profiles was also studied. Using the effective velocity from Gassmann and patchy saturation models, waveforms for the same source and receiver pairs were generated and travel time delays against the $CO_2$ injection time were plotted. As seen in FIG. 4, although the trend in travel time delays vs $CO_2$ injection time plots are similar for the two models, the magnitudes of the delay time from the Gassmann model is significantly higher. This is because the effective compressional velocity $V_p$ from the patchy saturation model is less affected by $CO_2$ injection and results in a higher velocity.

According to one aspect, there are at least three pieces of information that can be utilized from the travel time delay measurements for monitoring $CO_2$. First, the presence of $CO_2$ in the ray path of the wave between source and receiver can be determined based on the delay time analysis. Second, delay time caused by $CO_2$ injection increases as the injected $CO_2$ replaces the residual oil in the reservoir. When the $CO_2$-oil bank reaches the production well, or if $CO_2$ sweeps the residual oil from the pathway of the wave (no more change in saturation) between the source and receiver pair, then the delay in arrival time is at the peak, and is indicative either of $CO_2$ presence in the reservoir relative to the position of source and receiver pairs or the $CO_2$-oil bank reaching the production well at the depth of the receiver. Third, measurements of delay time in direct arrivals can be utilized for determining the rock physics model suitable for the reservoir. These three points are discussed in detail below with reference to FIGS. 5-8.

Figure 5:
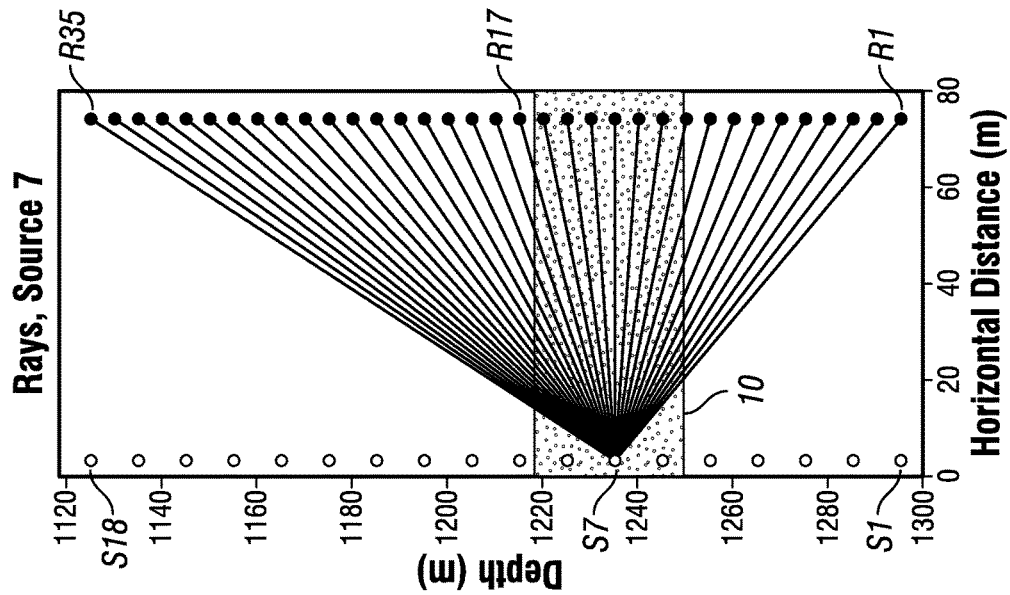
FIG. 5 is a simplistic plot of seismic rays between a particular source and an entire array of receivers in a first embodiment.
Figure 6B:
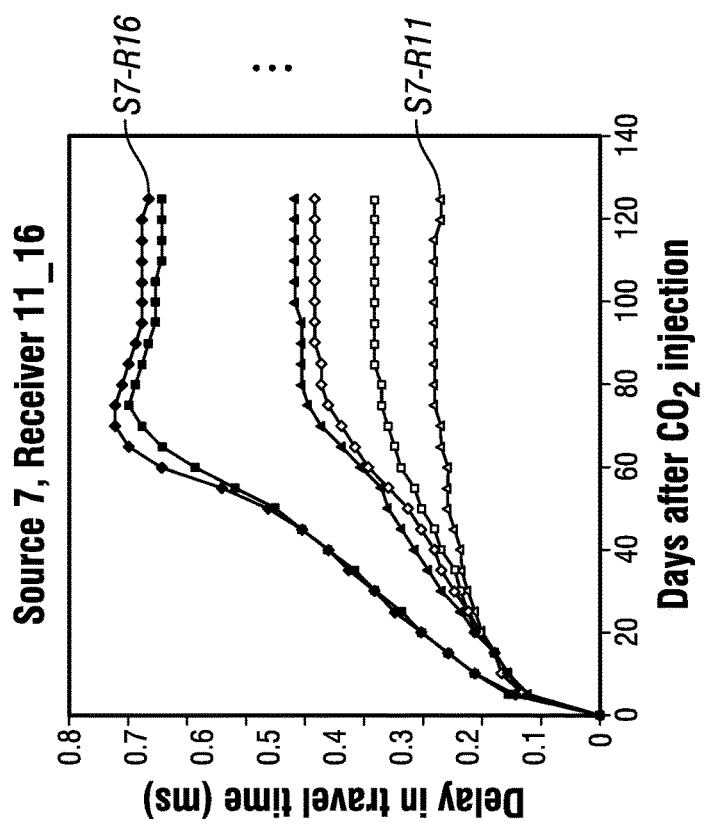
FIGS. 6a-6c are plots of delay in travel time versus days after carbon dioxide injection for the receivers shown in FIG. 5.
Figure 6A:
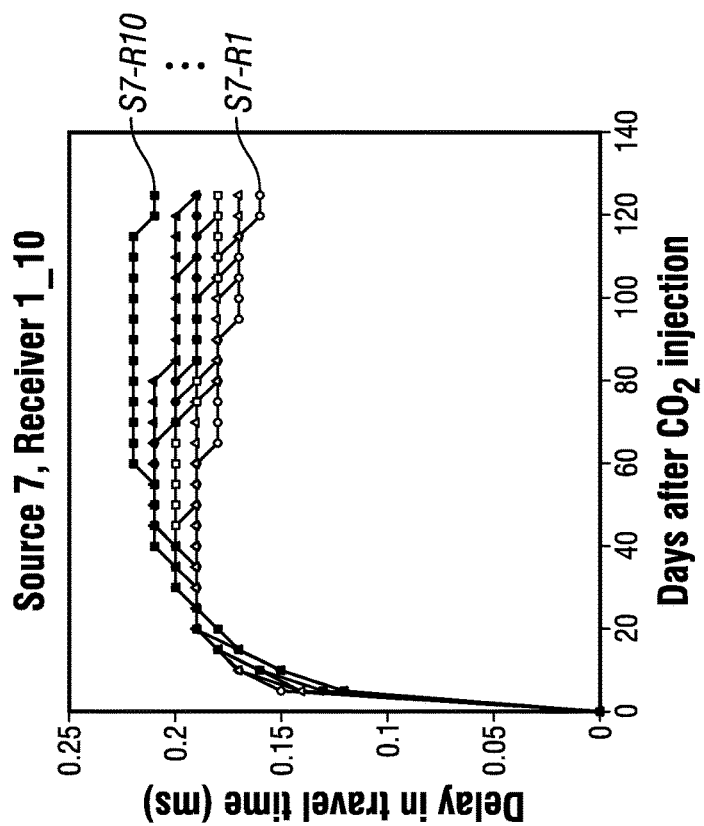
Figure 6C:
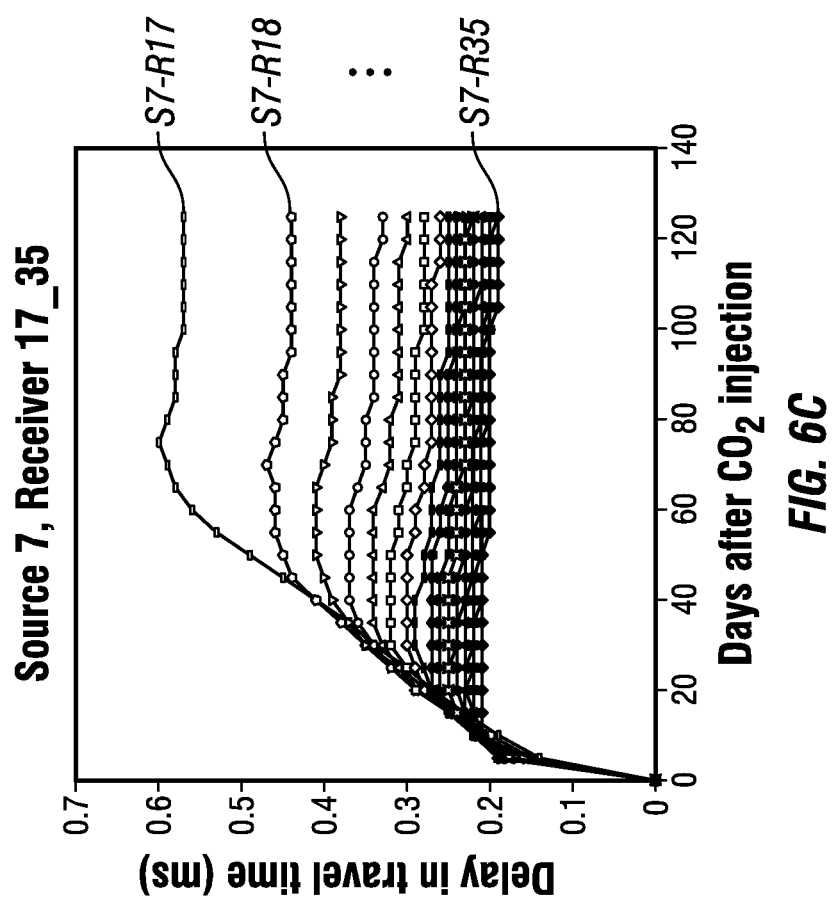

Turning now to FIG. 5, the seismic rays from source S7 in the injection well and all the receivers in the production well are shown. In FIGS. 6a-6c, the time-lapse travel time delay curves at each receiver for S7 are shown as a function of time (days of $CO_2$ injection). The trends in delay time versus $CO_2$ injection time plots are similar in that the delay times become nonzero as soon as the $CO_2$ plume crosses paths between source and receiver pairs. With increasing $CO_2$ saturation, the delay in travel time increases until the fluid saturation and pressure do not change any longer (it being assumed that temperature is constant). The magnitude of the travel time delay varies with different source-receivers configurations but overall, trends in the travel time delay curve remain the same.

In one embodiment, certain source-receiver configurations are favored over others to improve the ray coverage through the $CO_2$ plume and have a better contrast in delay time. This is because $CO_2$ plumes tend to migrate upward due to buoyancy (when $CO_2$ is lighter) and the plumes do not always sweep the oil at the bottom of the reservoir. Thus, in the reservoir model of FIG. 1, pairing any source and receiver at the depth of 110 m or below will not create significant measurable delay time. Instead, if sources and receivers are paired such that the acoustic ray from one to the other stays within the $CO_2$ plume or goes through part of $CO_2$ plume, the delays in direct arrivals are measurable quantities. For example, if source S7 is paired with receivers R17-R35 as shown in FIG. 6c, the direct arrivals at each receiver are sufficiently different from the baseline. The difference in delay time from baseline can be utilized for $CO_2$ migration prediction relative to the source-receiver locations provided that the reservoir is not too thick. Thick reservoirs without low permeability interlayers will have lower sweep efficiency of $CO_2$ injection due to buoyancy and much of the injected $CO_2$ will be accumulated beneath the caprock. Also, time-lapse measurements of delay times can be used to predict spatial distribution of $CO_2$ plume at a later time but the success of this method relies on continuous measurements of delay time and having a substantially homogeneous reservoir.

Figure 8:
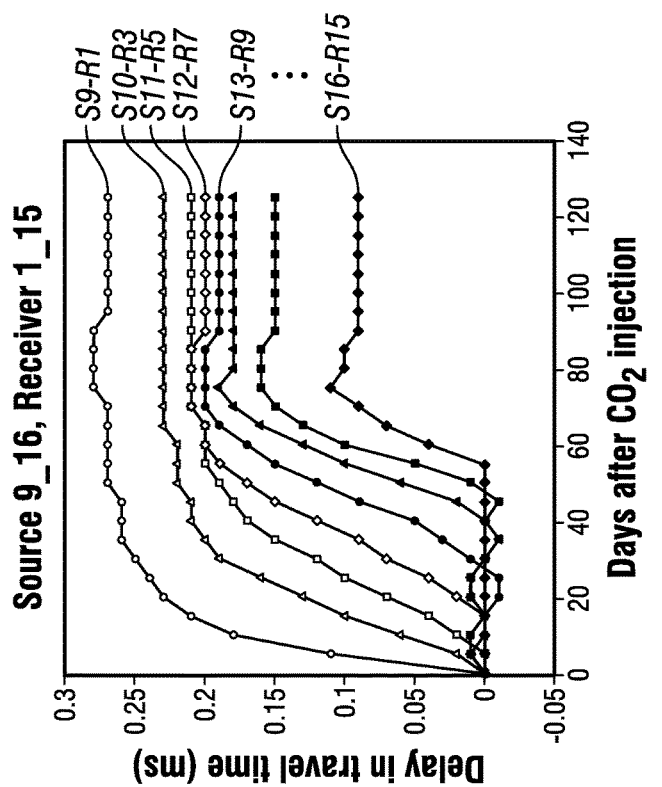
FIG. 8 is a plot of travel delay time for the eight parallel rays of FIG. 7 versus days after carbon dioxide injection.

Source and receiver configurations can be optimized so that the ray paths between sources and receivers trace $CO_2$ plume with the same angles. An example of such configuration is given in FIG. 7. In this case, the rays between different source-receiver pairs are parallel and penetrate the reservoir at different distances away from the injection well. Delays in arrival times for this configuration are shown in FIG. 8. These plots can be instrumental for predicting $CO_2$ movement at a particular time. For instance, based on FIG. 7, it is seen that that the ray between the source S14 and the receiver R11 crosses the reservoir at about 50 m radially away from the injection well. In FIG. 8, it is seen that the delay in arrival time in the seismogram between the same source and receiver is zero after 40 days of $CO_2$ injection indicating that $CO_2$ plume has not yet reached the radial depth of 50 m from the injection well. However, after 60 days of $CO_2$ injection, the delay in the arrival time is about 0.15 ms, and thus it may be concluded that the $CO_2$ plume is present at 50 m from the injection well by that time. Similar analysis can be done on time-lapse measurements of arrival delay times for different source and receiver pairs to approximate the velocity and predict the $CO_2$ arrival in the monitoring well. The delay in travel time along a particular ray path is useful to identify the boundary between regions with and without $CO_2$.

By way of example, using an arrangement similar to that of FIG. 7, where a plurality of acoustic sources are located in a first well above the depth of a reservoir of interest located beneath a caprock, and a plurality of acoustic receivers are located in a second well in and/or below the depth of the reservoir of interest, the seismic signals from respective sources to respective receivers cross the reservoir of interest. As carbon dioxide is injected into the reservoir of interest from the first well, the acoustic sources are activated over a period of time (e.g., daily), and the travel times of direct arrivals are measured at the receivers, e.g., using equation (2). For buoyant $CO_2$ it will be appreciated that the path from the source closest to the depth of the reservoir will be the first path invaded by carbon dioxide, followed in turn by the paths of the sources above that source. Since the paths start extending through the reservoir at different horizontal distances from the first well, the onset of the carbon dioxide at the interface between the reservoir and the formation caprock can be tracked. In addition, based on the tracking, the speed of movement of the carbon dioxide in the reservoir can be approximated and an expected date of breakthrough of the carbon dioxide to the production well can be calculated. For example, it is seen from FIG. 8 that the carbon dioxide is sensed by the travel-time delay in the source S9-receiver R1 ray path on day 1 (where the horizontal distance of the ray path intersects the reservoir approximately 5 m from the injection well), by the travel-time delay in the source S10-receiver R3 ray path on day 8 (horizontal distance of 15 m from the injection well), by the delay in the source S11-receiver R5 ray path on day 18 (horizontal distance of 25 m from the injection well), and by the delay in the source S12-receiver S7 ray path on day 28 (horizontal distance of 35 m from the injection well). From this pattern, it is seen that the carbon dioxide velocity decreased from about 3 m/day in the first few days to 1 m/day for about twenty days, and therefore can expect to stay steady at about 1 m/day. At that rate, it can be predicted that the carbon dioxide is likely to reach the production well which is 70 m from the injection well at about day 63. Indeed, FIG. 8 shows that delay in the source S16-receiver S15 ray path occurs at about day 60, at a horizontal distance of about 65 m from the injection well which is very near the production well, which confirms the prediction.

Tracking of the carbon dioxide at depths below the caprock/reservoir interface may also be determined from the delay time in the seismic signals. For example, and as previously described, FIG. 8 shows the delay time as a function of days after the start of carbon dioxide injection for the eight ray paths of FIG. 7. For ray paths that extend entirely through the reservoir (such as source S9-receiver R1, source S10-receiver R3, source S11-receiver R5, etc.), the delay time increases as more and more of the ray path is invaded by carbon dioxide. Eventually, when the entire ray path extends through a carbon dioxide invaded portion of the formation, the delay reaches a peak value at which point elastic properties do not change. Thus, by knowing the distance of the ray path through the reservoir, and by knowing the delay introduced by each meter of path that is completely saturated by the carbon dioxide, it is possible to approximately determine the location at which the carbon dioxide saturation is reduced or ceases.

Figure 7:
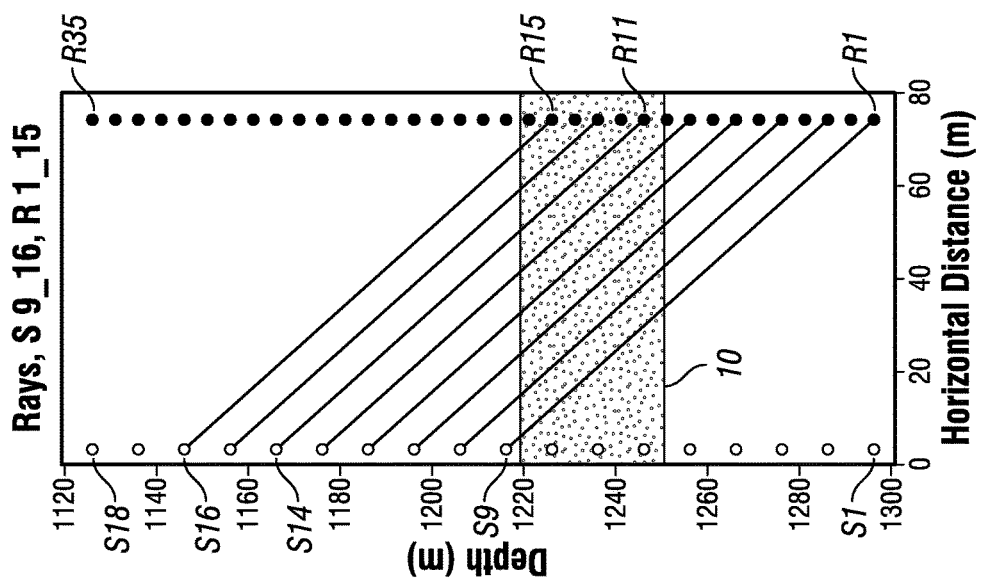
FIG. 7 is a simplistic plot of parallel seismic rays between eight vertically displaced sources and eight vertically displaced receivers in the first embodiment.
Figure 9B:
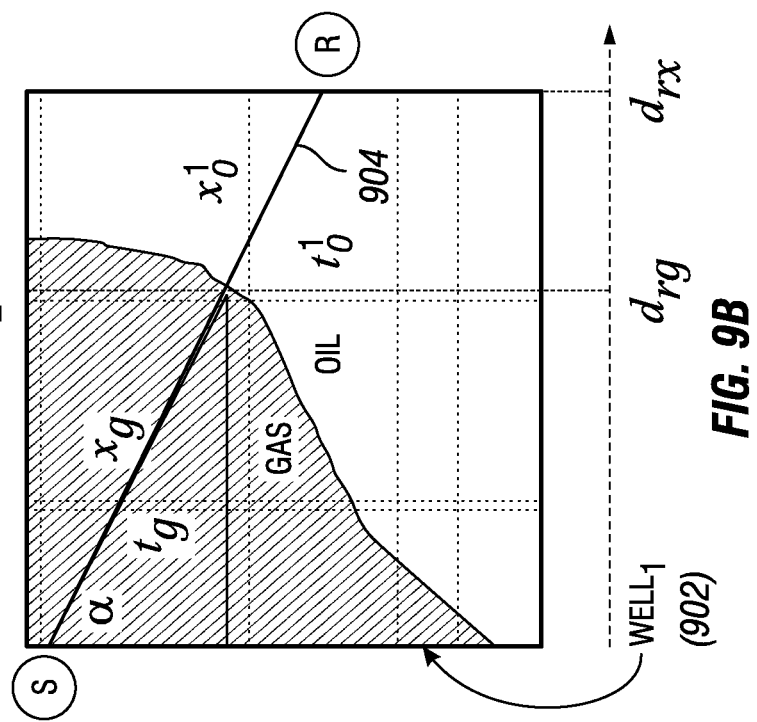
FIGS. 9a and 9b are plots of seismic rays through a reservoir containing oil before carbon dioxide injection and after carbon dioxide injection.
Figure 9A:
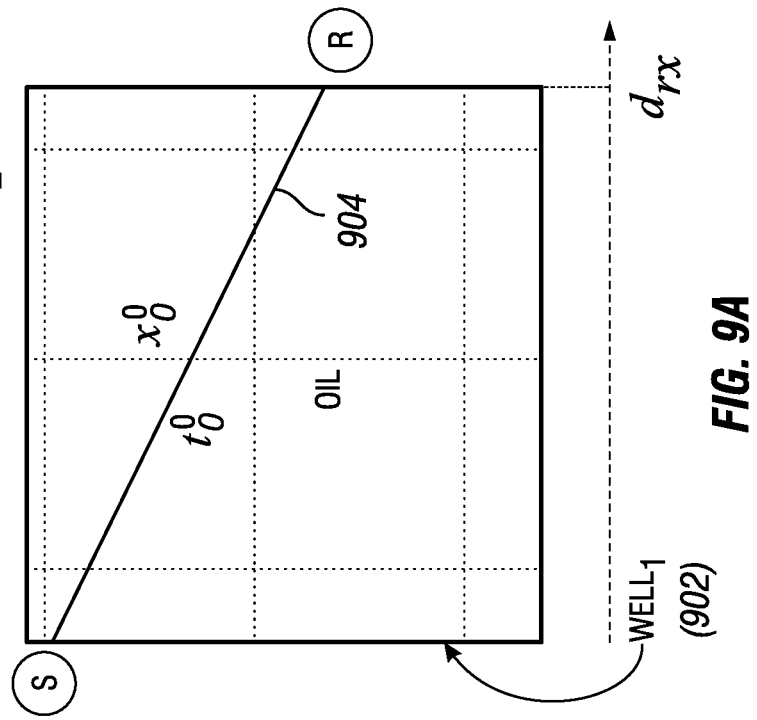

More particularly, using a ray path (904) from the arrangement of FIG. 7, and turning to FIG. 9a, it will be appreciated that before injection $CO_2$ into the reservoir, the baseline time for a seismic signal along a ray path having a known length $x_o^0$ to reach a receiver R from a source S is measured as $t_o^0$, where $x_o^0 = V_o t_o^0$. Here $V_o$ is the effective sound speed of initial oil formation. In addition, the ray path length and the radial distance $d_{rx}$ between the injection and production wells are related by $d_{rx} = x_o^0 \sin\alpha$ where $\alpha$ is an angle between the acoustic ray (904) and a wellbore axis (902) or some other reference (e.g., a perpendicular line normal to a top of a reservoir). At some point after injection of the $CO_2$ into the reservoir, as seen in FIG. 9b, the ray path time increases to $t_g + t_o^1$ where $t_g$ is the time spent traveling through $CO_2$ zone having a ray path length of $x_g$, and $t_o^1$ is the time spent traveling through oil zone having a ray path length $x_o^1$. Thus, a travel time delay $\tau$ can be calculated by ($\tau = t_g + t_o^1 - t_o^0$), and the ray path lengths through the $CO_2$ and oil are related by $$x_o^0 = x_g + x_o^1 = V_g t_g + V_o t_o^1 \qquad (3)$$

where $x_o^1$ is the length of the ray path in the oil zone, $V_g$ is the effective sound speed of rock invaded with the $CO_2$. It can be shown that $$t_g = \frac{V_o \tau}{V_o - V_g}, \; x_g = \frac{V_g V_o \tau}{V_o - V_g}, \text{ and } d_{rg} = x_g \sin\alpha \qquad (4)$$

where $d_{rg}$ is the radial distance of the gas front from the injection well. Here it is assumed that the gas movement has a well-defined interface called the "front". By way of example only, if $V_g = 3500$ m/s, $V_o = 3700$ m/s, and $\tau = 0.3$ ms, $x_g$ can be calculated as equal to 12.95 m, and where $\alpha = 30°$, $d_{rg} = 6.475$ m, thereby defining the $CO_2$ front at a depth in the reservoir $d_z = d_s + x_g \cos\alpha$ where $d_s$ is the depth of the source.

Given the above, according to one embodiment, one or more high frequency piezoelectric acoustic sources such as Schlumberger's Z-TRAC are located in a first (injection) well, at or near the depth of a reservoir of interest located beneath a caprock, and a plurality of acoustic receivers such as an array of Distributed Acoustic Sensors (DAS) are located in a second (detection and/or production) well in or near the depth of the reservoir of interest. The one or more sources and the receivers may be located above, below, or at the reservoir depth, as long as the direct ray paths from the one or more sources to the receivers extend through the reservoir. In one embodiment, a test with the sources and receivers is conducted prior to injection of carbon dioxide into the reservoir of interest from the first well with the sources being activated and the receivers detecting resulting signals in order to find the delay in travel time of the seismic signals utilizing equation (2). In one embodiment, the sources and receivers are kept in the respective wells continuously (e.g., they are built into completions within the wells). In another embodiment, the sources and/or receivers are removed from one or both wells and returned to the wells at a later time in substantially their same locations (e.g., using wireline tool strings). In any event, carbon dioxide is injected from the injection well into the reservoir and the one or more acoustic sources are activated over a period of time (e.g., daily), and the travel times of direct arrivals are measured at the receivers. Over time, based on detected travel time delays, the presence of the carbon dioxide at locations in the reservoir relative to the source and receiver locations (i.e., the carbon dioxide front) is identified, e.g., using equations (3) and (4). In addition, the carbon dioxide arrival time at the production well can be predicted.

It should be appreciated that the time-lapse travel time delay method is very effective in monitoring the migration of a $CO_2$ plume away from the injection well. It is robust and not affected by attenuation. Time-lapse crosswell seismic measurements with optimized source-receiver configuration have the capability of determining $CO_2$ plume spatially and predict $CO_2$ arrival in the injection well. According to one aspect, because the maximum travel time delay is small (<1 ms) in the time-lapse travel time delay method, it is desirable that the source-receiver configuration be repeatable. In other words, it is desirable that if the seismic sources and receivers are to be removed from the wells between tests that the sources and receivers be precisely located to the same depth locations upon the next test.

In one aspect, the process of monitoring $CO_2$ movement in a reservoir utilizing direct arrivals does not make use of reflected waves, although reflected waves can carry important information about the velocity field and can provide additional information for monitoring $CO_2$. FIGS. 10-13b relate to a second embodiment which utilizes reflected seismic waves in providing information regarding $CO_2$ movement in a reservoir.

If full seismic waveforms are analyzed, it can be shown that there are several phases appearing in the seismograms following the direct arrival: waves reflected from the top of the reservoir ('P'P and 'P'S) and waves reflected from the underburden ('P'P'P and 'P'P'S), where P and S stand for compressional and shear wave respectively. Here, 'P'P and 'P'S are the P to P and P to S waves reflected from the top of the reservoir. 'P'P'P and 'P'P'S are the P to P and P to S waves reflected from the bottom of the reservoir, respectively. In addition, it can be shown that there is a significant change in the amplitude of 'P'P wave from a baseline. Presence of $CO_2$ at the top of the reservoir changes the impedance and the amplitudes of the reflected waves. By calculating the reflection coefficients of 'P'P waves for velocities at baseline and after 125 days of $CO_2$ injection and plotting the calculated reflection coefficients against angles ($\alpha$) a small but measurable change in amplitude of 'P'P phase caused by the presence of $CO_2$ can be observed. For this source and receiver configuration, the relative change is the highest if the angle ($\alpha$) is about 50°. In order to calculate the changes in the amplitude and the waveform of 'P'P phase, a window can be used to encompass the 'P'P phase. The time-lapse changes in amplitudes and waveforms are calculated by using the following equations, respectively:

$$C_A = \frac{\max_{T_w}|d_n(x_s, x_r, t)| - \max_{T_w}|d_0(x_s, x_r, t)|}{\max_{T_w}|d_0(x_s, x_r, t)|} \quad (5)$$

$$C_w = \frac{\int_{T_w}(d_n(x_s, x_r, \tau) - d_0(x_s, x_r, \tau))^2 d\tau}{\int_{T_w}d_0(x_s, x_r, \tau)^2 d\tau} \quad (6)$$

where $d_0$ and $d_n$ are baseline and perturbed waveforms and $T_w$ is the time interval (window) of interest.

Figure 10:
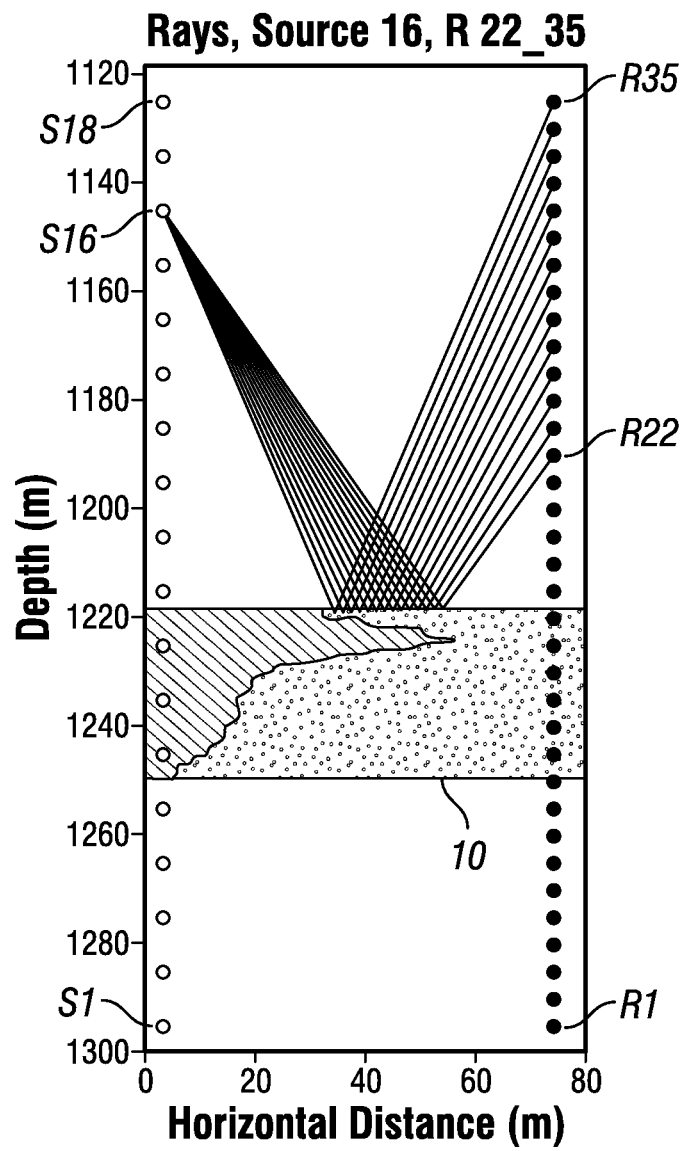
FIG. 10 is a plot of reflected seismic rays between a particular source and multiple receivers in a second embodiment.
Figures 11A, 11B:
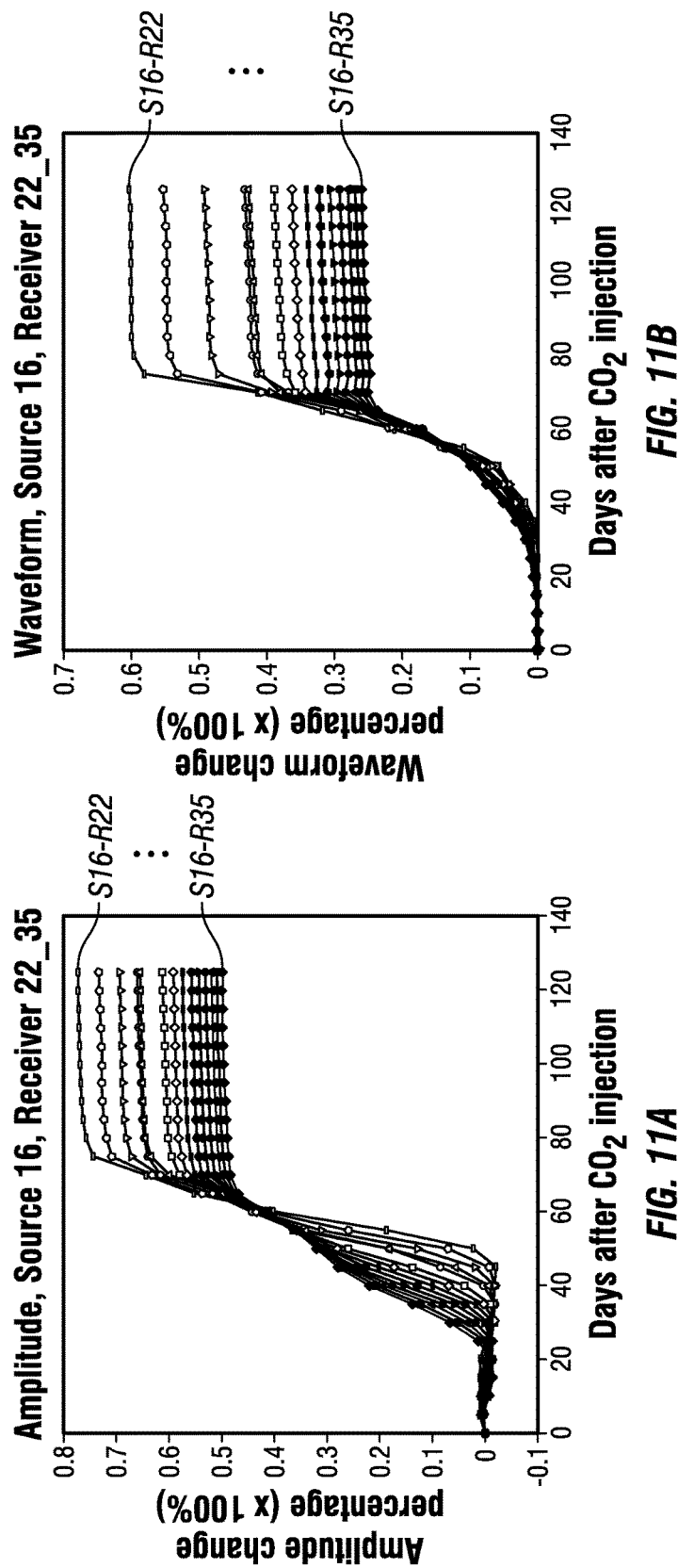
FIGS. 11a and 11b are plots of amplitude changes and waveform changes versus days after carbon dioxide injection for the source and receivers of FIG. 10.
Figure 12:
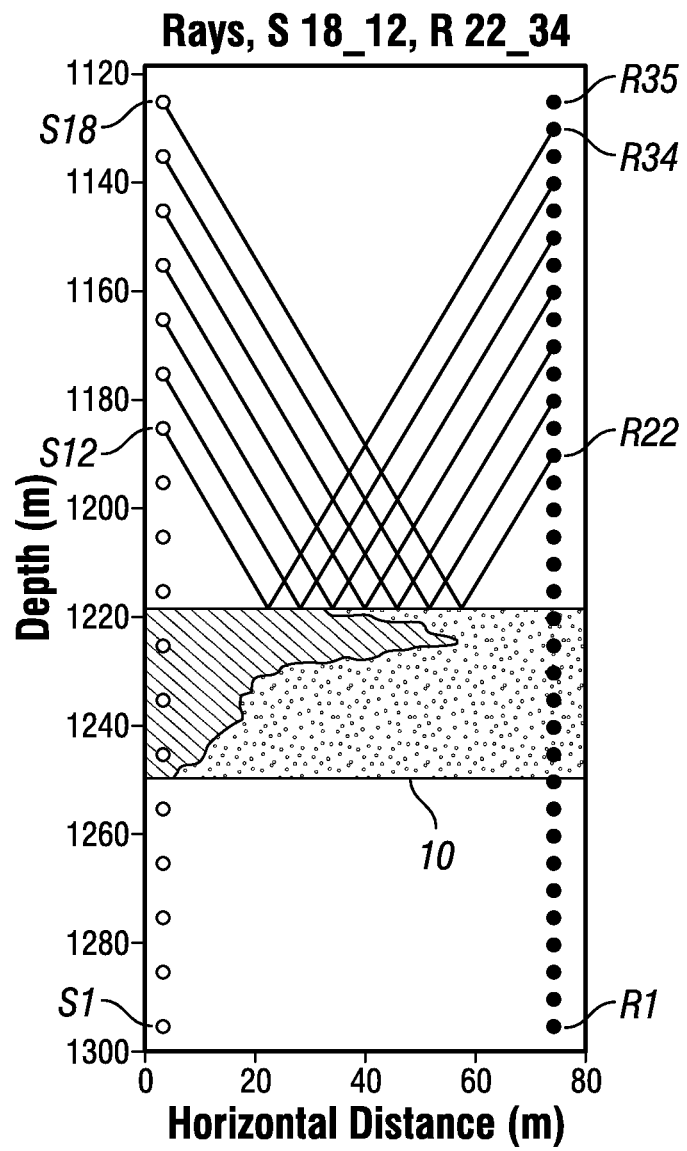
FIG. 12 is a plot of reflected seismic rays between seven sources and seven receivers in the second embodiment.

In FIG. 10, sources and receivers are arranged as described above with reference to FIG. 1. The ray paths in FIG. 12 are shown from a single source, S16, to multiple receivers R22-R35, with the seismic waves reflected off of the caprock-reservoir interface. Time-lapse amplitude and waveform changes from equations (3) and (4) for various source and receiver pairs were measured. An example of time-lapse changes in the amplitude and waveform of the 'P'P phase with respect to $CO_2$ injection for source S16 and receivers R22-35 is given in FIGS. 11a and 11b. The amplitude and waveform start changing when $CO_2$ reaches to a reflection point at the top of the reservoir. The magnitudes of the amplitude and the change in waveform are comparable. Both approaches are suitable for monitoring $CO_2$ plume formation underneath the caprock, but the method of amplitude change is more robust and less affected by the noise. Similar to the delay time of direct arrival plots, nonzero change in the amplitude or full waveform is indicative of the presence of $CO_2$ relative to the source and receiver locations and the reflector (caprock-reservoir interface). The fact that $CO_2$ is buoyant and tends to accumulates underneath the caprock after injection, suggests that the methods of amplitude and waveform changes will be effective primarily for monitoring $CO_2$ movement directly below the caprock; i.e., at the interface of the caprock and reservoir and to about one-half of the seismic source wavelength beyond which for seismic source wavelengths is between 5 m and 15 m, and most typically approximately 10 m.

In one aspect, coverage of reflection points at the top of the reservoir is desired. In order to monitor $CO_2$ movement between the injection and the production wells, sufficient number of reflection points are useful at the top of the reservoirs because, with this method, the presence of $CO_2$ is found at the reflection points. In the case of using a single shot location, the reflection points cover only a small area at the top of the reservoir, thereby limiting $CO_2$ monitoring to a small area at the top of the reservoir.

Figure 13A:
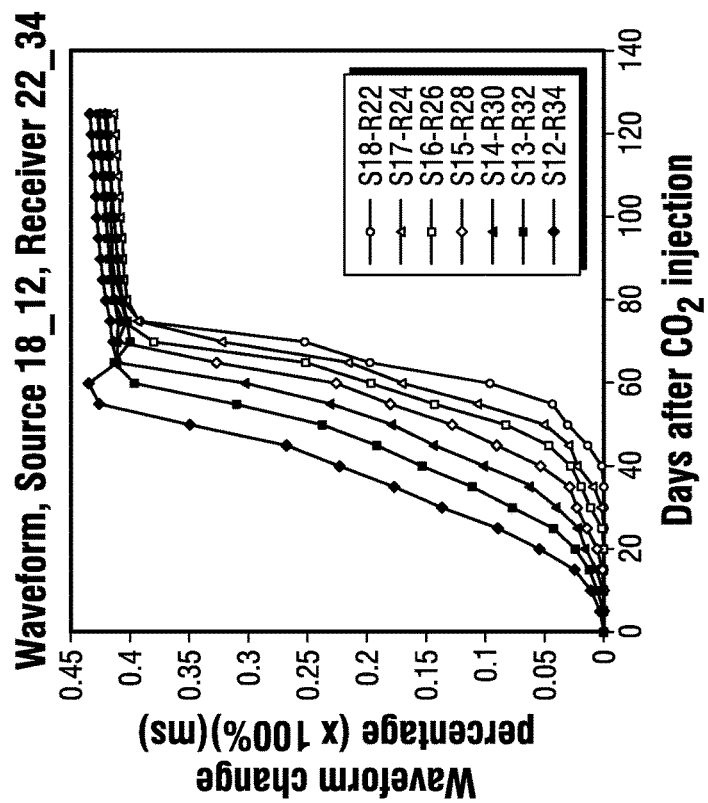
FIGS. 13a and 13b are plots respectively of amplitude change and waveform change percentages versus days after carbon dioxide injection for the reflected seismic rays of FIG. 12.
Figure 13B:
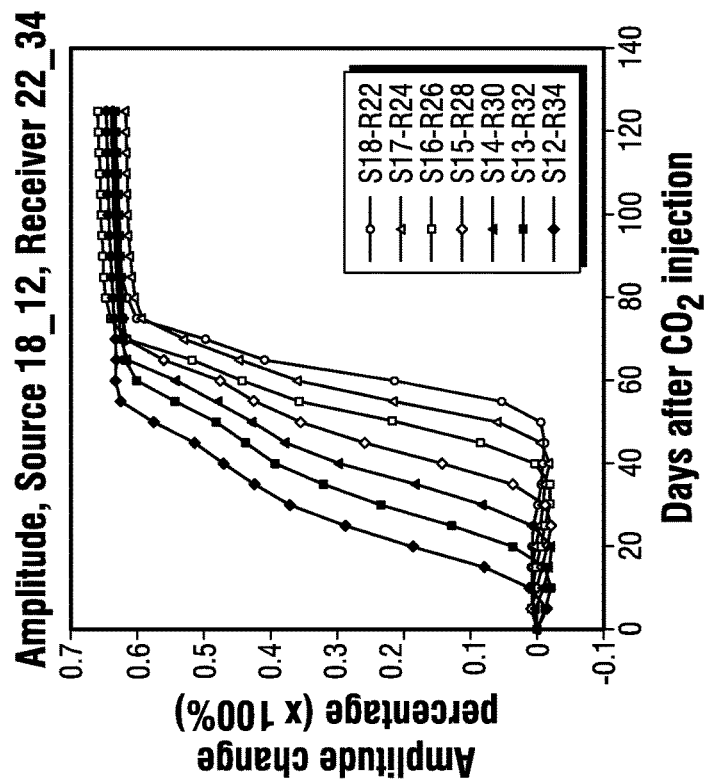

In one aspect, different source-receiver configurations were assessed in order to optimize the coverage of reflection points for the reservoir. One desirable example is seen in FIG. 12. In the configuration of FIG. 12, the reflection points of different rays span a larger radial range (>40 m) and the angles ($\alpha$) are optimized for the largest amplitude change (50°). Plots such as FIGS. 13a and 13b can be useful in monitoring $CO_2$ underneath the cap rock and making prediction of $CO_2$ arrivals in the producer possible. FIGS. 13a and 13b relate $CO_2$ presence at the reflection point to real time ($CO_2$ injection time) so the presence of $CO_2$ at the reflection point can be inferred using the time at which nonzero amplitude change occurs. For example, it is seen in FIG. 13a that the amplitude of the reflected seismic ray of source S18-receiver R22 (having a reflection point at approximately 60 m from the injection well) starts differing from the baseline after approximately 50 days of $CO_2$ injection. Similarly, in FIG. 13b is it seen that the waveform of the reflected seismic ray of source S18-receiver R22 starts differing from the baseline after approximately 45 to 50 days of $CO_2$ injection. It will be appreciated in FIGS. 13a and 13b, that the amplitude and waveform changes continue to increase over time as the depth of the $CO_2$ under the caprock-reservoir interface increases. However, since the method is sensitive to the presence of $CO_2$ at a location of at most one-half of the seismic source wavelength beyond the interface, upon $CO_2$ reaching a depth of about one-half of the seismic source wavelength under the interface, the amplitude and waveform cease changing; i.e., the curves flatten.

It is noted that the effects of attenuation and fluid substitution models on amplitude change were tested and it was observed that the magnitude change in amplitude is affected by the attenuation and the use of different rock physics models (patchy saturation vs Gassmann models). However, the pattern in time-lapse amplitude change versus $CO_2$ injection time remains the same and conveys similar information about the movement of $CO_2$ plume. Thus, for purposes of brevity, only the Gassmann elastic model is shown in FIGS. 13a and 13b.

Based on the above, a plurality of acoustic sources such as Schlumberger's Z-TRAC are located in a first (injection) well, above a reservoir of interest located beneath a caprock, and a plurality of acoustic receivers such as an array of Distributed Acoustic Sensors (DAS) are located in a second (detection and/or production) well above the reservoir of interest. In one embodiment, a test with the sources and receivers is conducted prior to injection of carbon dioxide into the reservoir of interest from the first well with the sources being activated and the receivers detecting resulting signals in order to find the reflected wave waveforms and/or amplitudes. In one embodiment, the sources and receivers are kept in the respective wells continuously. In another embodiment, the sources and/or receivers are removed from one or both wells and returned to the wells at a later time in substantially their same locations. In any event, carbon dioxide is injected from the injection well into the reservoir and the acoustic sources are activated over a period of time (e.g., daily), and waveforms and/or amplitudes of the reflected waves are measured at the receivers according to equations. Over time, based on the waveform and/or amplitude changes of the detected waves as determined, e.g., by equations (5) and (6), the presence of the carbon dioxide at locations at the reservoir-cap rock interface relative to the source and receiver locations (i.e., the carbon dioxide front)

is identified. In addition, the carbon dioxide arrival time at the production well can be predicted by tracking the movement of the front.

In summary, measurable changes in amplitudes and waveforms caused by $CO_2$ injection are observed. With this method, measurements of amplitudes and waveforms are repeatable and will not be affected by small shifts in source-receiver locations during repeat surveys. Also, attenuation does not appear to affect the result as the signal to noise ratio can be increased by stacking rays reflected from the same reflection points. The method is suitable for monitoring $CO_2$ at and just underneath the caprock (or reflector).

In one aspect, some of the methods and processes described above, such as measuring delay times in direct arrivals using the cross correlation of a reference waveform (baseline) with another waveform are performed by a processor which may be located downhole or uphole. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCM-CIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Thus, by way of example only, and not by way of limitation, while various embodiments describe a formation traversed by two boreholes in which seismic sources and receivers are respectively located, it will be appreciated that additional boreholes may be provided with receivers (sensors) in those boreholes. With multiple boreholes equipped with sensors, mapping of carbon dioxide fronts can be accomplished in three dimensions. Also, while particular formation models were described, it will be appreciated that other models could be utilized. Also, while methods for tracking carbon dioxide movement in a reservoir have been set forth that use the determination of delay of direct ray paths and that use the change in amplitude and/or waveform of reflected waves, it will be appreciated that the two may be used together. More particularly, in one embodiment, the determinations of change in amplitude and/or waveform of reflected waves may be used as a confirmation or check on the determinations made as to the carbon dioxide front made utilizing direct ray path delay. This may be accomplished without the use of additional sources and detectors, particularly where multiple sources and detectors above the reservoir are used in the direct ray path delay measurements. Accordingly, all such modifications are intended to be included within the scope of this disclosure as defined in the following claims.

What is claimed is:

1. A method of tracking carbon dioxide migration in a hydrocarbon-bearing reservoir located in a formation traversed by two boreholes spaced from each other, the method comprising:

locating at least one seismic source in a first of the two boreholes and a plurality of receivers in a second of the two boreholes, wherein the at least one seismic source and the plurality of receivers arranged such that direct paths from the at least one seismic source to the plurality of receivers extend through the reservoir, wherein the at least one seismic source comprises a plurality of seismic sources that each provide source signals that are substantially parallel to one another and wherein each source signal travels from a first height to a second height that is lower than the first height;

injecting carbon dioxide from the first of the two boreholes into the reservoir;

activating the at least one seismic source multiple times over multiple days and detecting seismic signals at the plurality of receivers;

from the seismic signals detected at the plurality of receivers, finding travel time delay of direct arrivals of the seismic signals over time; and using the travel time delays to track a carbon dioxide front in the reservoir as a function of time.

2. The method of claim 1, wherein the tracked carbon dioxide front includes a radial distance of the front from the injection well as a function of depth.

3. The method of claim 2, wherein: the radial distance of the front is determined according to $d_{rg} = x_g \sin \alpha$, where $d_{rg}$ is the radial distance, $x_g$ is a distance a seismic signal travels through a carbon dioxide invaded portion of the reservoir, and $\alpha$ is an angle between an acoustic ray relative and a reference point, and where $$x_g = \frac{V_g V_o \tau}{V_o - V_g},$$

$V_g$ is an effective sound speed in a $CO_2$ flooded reservoir, $V_o$ is an effective sound speed in the initial oil reservoir and $\tau$ is a measured travel time delay.

4. The method of claim 1, further comprising: estimating an arrival time of carbon dioxide at the second borehole.

5. The method of claim 1, wherein: the at least one seismic source comprises a plurality of seismic sources with at least two seismic sources located above the reservoir, and the plurality of receivers include at least one receiver located beneath the reservoir.

6. The method of claim 1, wherein: the at least one seismic source comprises a plurality of seismic sources with at least one seismic source located at a depth of the reservoir, and the plurality of receivers include at least one receiver located beneath the reservoir.

7. The method of claim 1, wherein: the at least one seismic source comprises a plurality of seismic sources with a plurality of seismic sources located above the reservoir, at least one seismic source located at the depth of the reservoir, and the plurality of receivers include a plurality of receivers located beneath the reservoir and at least one receiver located at the depth of the reservoir.

8. The method of claim 1, wherein: the locating comprises placing the at least one seismic source in the first of the two boreholes and the plurality of receivers in the second of the two boreholes a first time, and activating the at least one seismic source a first time, and detecting the seismic signals a first time to obtain a baseline, and repeating the activating and the detecting a plurality of times over multiple days.

9. The method of claim 8, further comprising: between repetitions of the activating and the detecting, removing the plurality of receivers from the second of the two boreholes and then locating the plurality of receivers in the second of the two boreholes again at substantially identical locations.

10. The method of claim 9, further comprising: between repetitions of the activating and the detecting, removing the at least one source from the first of the two boreholes and then locating the at least one source in the first of the two boreholes again at a substantially identical location.

11. The method of claim 1, further comprising: from the seismic signals detected at the plurality of receivers determining at least one of an amplitude change and a seismic waveform change of reflected signals, wherein at least a first of the at least one seismic source is located above the reservoir, and at least a first plurality of the plurality of seismic receivers are located above the reservoir; and using the at least one of an amplitude change and a waveform change to track carbon dioxide migration at the top of the reservoir as a function of time.

12. A method of tracking carbon dioxide migration in a hydrocarbon-bearing reservoir located in a formation traversed by two boreholes spaced from each other, the method comprising:

locating a plurality of seismic sources in a first of the two boreholes and a plurality of receivers in a second of the two boreholes, the plurality of seismic sources located above the reservoir, and the plurality of receivers located above the reservoir, wherein the plurality of seismic sources each provide source signals that are substantially parallel to one another and wherein each source signal travels from a first height to a second height that is lower than the first height;

injecting carbon dioxide from the first of the two boreholes into the reservoir;

activating the plurality of seismic sources multiple times over multiple days and detecting seismic signals that reflect off the top of the reservoir at the plurality of receivers;

from the seismic signals detected at the plurality of receivers, finding at least one of waveform change and amplitude change of the seismic signals over time;

using the at least one of waveform change and amplitude change to track carbon dioxide at the top of the reservoir as a function of time.

13. A method according to claim 12, wherein: changes in amplitudes are calculated according to $$C_A = \frac{\max_{T_w}|d_n(x_s, x_r, t)| - \max_{T_w}|d_0(x_s, x_r, t)|}{\max_{T_w}|d_0(x_s, x_r, t)|}$$

where $C_A$ is the change in amplitude, $d_o$ and $d_n$ are a baseline and a perturbed seismic waveforms, $x_s$ and $x_r$ are source and receiver indices, and t is an arrival time within the specified travel time window $T_w$.

14. A method according to claim 12, wherein: changes in waveform are calculated according to $$\dot{C}_w = \frac{\int_{T_w}(d_n(x_s, x_r, \tau) - d_0(x_s, x_r, \tau))^2 d\tau}{\int_{T_w} d_0(x_s, x_r, \tau)^2 d\tau}$$

where, $C_w$ is the change in waveform, $d_o$ and $d_n$ are baseline and perturbed seismic waveforms, $x_s$ and $x_r$ are source and receiver indices, and t is an arrival time within the specified travel time window $T_w$.

* * * * *